US011111776B2

(12) United States Patent
Fan et al.

(10) Patent No.: US 11,111,776 B2
(45) Date of Patent: Sep. 7, 2021

(54) MULTIPLE SURFACE EXCITATION METHOD FOR DETERMINING A LOCATION OF DRILLING OPERATIONS TO EXISTING WELLS

(71) Applicant: Halliburton Energy Services, Inc., Houston, TX (US)

(72) Inventors: Yijing Fan, Singapore (SG); Hsu-Hsiang Wu, Sugar Land, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 16/605,177

(22) PCT Filed: Nov. 30, 2018

(86) PCT No.: PCT/US2018/063258
§ 371 (c)(1),
(2) Date: Oct. 14, 2019

(87) PCT Pub. No.: WO2020/112133
PCT Pub. Date: Jun. 4, 2020

(65) Prior Publication Data
US 2021/0079785 A1    Mar. 18, 2021

(51) Int. Cl.
*E21B 47/0228*    (2012.01)
*G01V 3/28*    (2006.01)
*E21B 43/24*    (2006.01)

(52) U.S. Cl.
CPC ............ *E21B 47/0228* (2020.05); *G01V 3/28* (2013.01); *E21B 43/2406* (2013.01)

(58) Field of Classification Search
None
See application file for complete search history.

(56) References Cited

U.S. PATENT DOCUMENTS

| 8,618,803 B2 | 12/2013 | Rodney et al. |
| 2007/0278008 A1 | 12/2007 | Kuckes et al. |

(Continued)

OTHER PUBLICATIONS

ISRWO International Search Report and Written Opinion for PCT/US2018/063258 dated Aug. 14, 2019.

*Primary Examiner* — Douglas X Rodriguez
(74) *Attorney, Agent, or Firm* — Benjamin Ford; C. Tumey Law Group PLLC

(57) ABSTRACT

A method and system for determining a position of a second production wellbore. The method may comprise inducing a first current into a first conductive member with a first source, emitting a first magnetic field generated by the first current from the first conductive member into a formation, inducing a second current into a second conductive member with a second source, emitting a second magnetic field generated by the second current from the second conductive member into the formation, disposing an electromagnetic sensor system into the second production wellbore, recording the first magnetic field with the at least one sensor from the formation, and recording the second magnetic field with the at least one sensor from the formation. The system may comprise a first source, an electromagnetic sensor system, at least one sensor and an information handling system configured to determine the position of the second production wellbore.

20 Claims, 5 Drawing Sheets

(56) References Cited

U.S. PATENT DOCUMENTS

| | | | |
|---|---|---|---|
| 2011/0100712 A1* | 5/2011 | Poedjono | G01V 1/42 |
| | | | 175/45 |
| 2016/0273337 A1 | 9/2016 | Donderici et al. | |
| 2017/0074087 A1* | 3/2017 | Donderici | E21B 7/04 |
| 2017/0229893 A1* | 8/2017 | Sequera | E21B 47/125 |
| 2017/0329035 A1 | 11/2017 | Wu et al. | |
| 2018/0003848 A1 | 1/2018 | Schmidt et al. | |
| 2018/0045034 A1 | 2/2018 | Wu et al. | |

* cited by examiner

MULTIPLE SURFACE EXCITATION METHOD FOR DETERMINING A LOCATION OF DRILLING OPERATIONS TO EXISTING WELLS

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic induction tools disposed on bottom hole assemblies may be employed in subterranean operations to determine direction and distance between two wellbores. Electromagnetic induction tools may use different techniques to obtain current on a conductive member in the target wellbore. Approaches may include directly injecting a current into the conductive member and/or inducing a current on a conductive member by transmitting electromagnetic fields by coil antennas positioned in a second wellbore. The injection of current from the electromagnetic induction tools may induce a current along the bottom hole assembly, which may create a direct signal. The direct signal may be sensed and recorded by a receiver disposed in a second wellbore. Recording the direct signal may allow an operator to determine the position of the second wellbore in relation to the target wellbore.

BRIEF DESCRIPTION OF THE DRAWINGS

These drawings illustrate certain aspects of some examples of the present disclosure, and should not be used to limit or define the disclosure.

DETAILED DESCRIPTION

This disclosure relates generally to an electromagnetic sensor system in wellbore operations, such as measuring-while-drilling (MWD), logging-while-drilling (LWD), wireline logging, and permanent monitoring operations. Specifically, this disclosure relates to the mitigation of undesired direct coupling between an electromagnetic source and a receiver in an electromagnetic sensor system. This coupling may be a result of conduction currents created on a metallic bottom hole assembly by the excitation of the electromagnetic source. In examples, tubulars may be disposed within the drill collar on a bottom hole assembly, a wireline tool mandrel, and/or permanently installed production casing. For brevity, the metallic tubular will be referred to as a bottom hole assembly below. The receiver in the electromagnetic sensor system may be a magnetometer and/or an induction coil, which may reside on the bottom hole assembly and/or outside. Similarly, where used, either electrode (source and return) may reside on the bottom hole assembly and/or outside, even on the surface. In certain types of electromagnetic sensor systems, electrical current may be injected into the formation via an electromagnetic source in the form of an electrode pair for logging, ranging, monitoring, and/or measurement purposes, among others.

Figure 1:
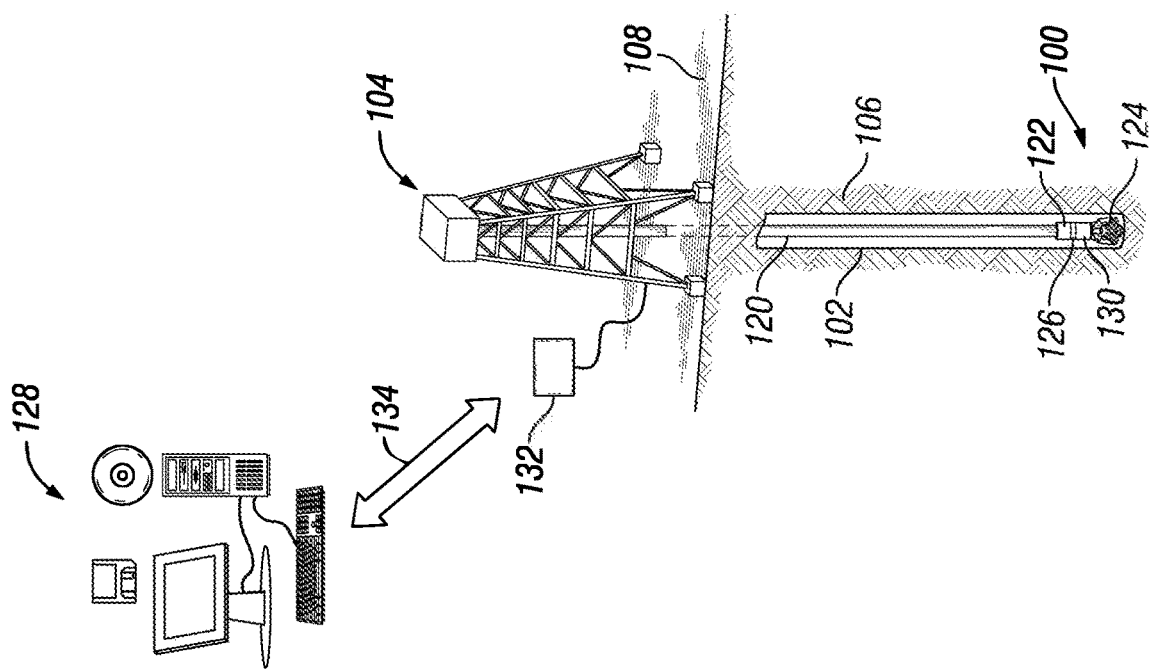
FIG. 1 illustrates an example of an electromagnetic sensor system in a wellbore for determining distance and location.
Figure 1:
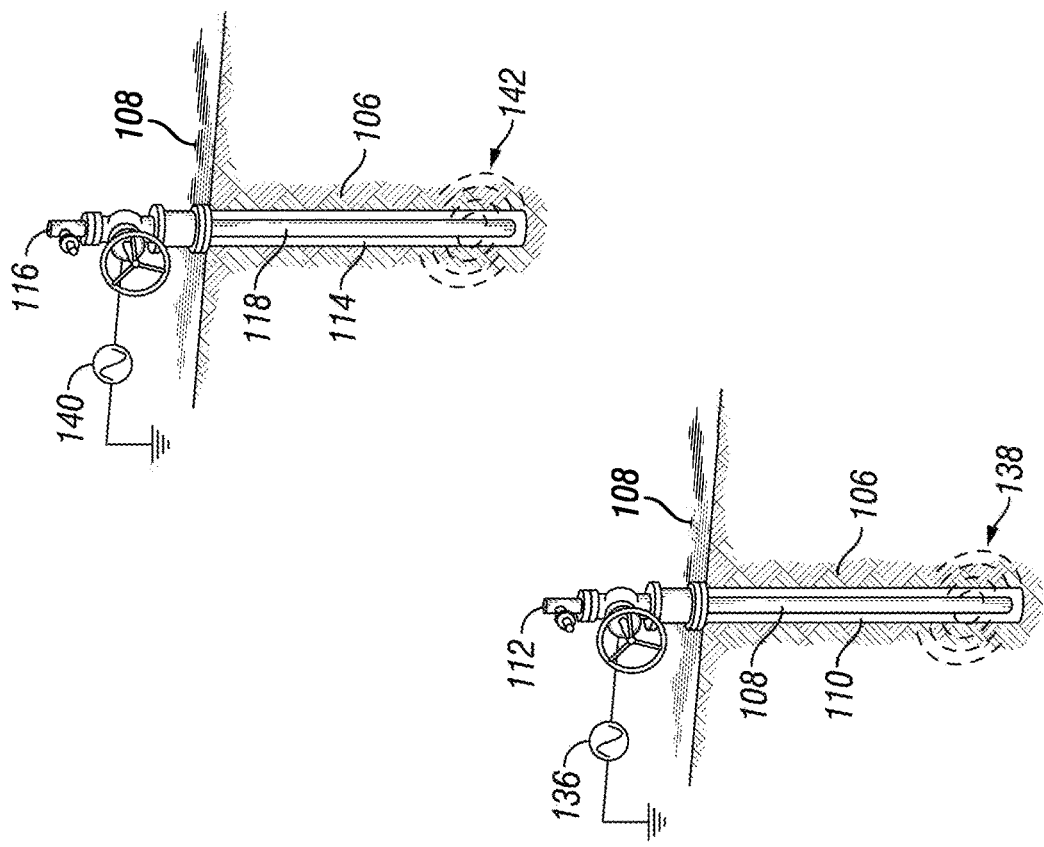

FIG. 1 illustrates an electromagnetic sensor system 100. Specifically, FIG. 1 shows an electromagnetic sensor system 100 for ranging. As illustrated, electromagnetic sensor system 100 may be disposed in a second production wellbore 102 that may extend from a first wellhead 104 into a subterranean formation 106 from a surface 108. FIG. 1 further illustrates first production wellbore 110, which may extend from a second wellhead 112 into subterranean formation 106 from surface 108. First production wellbore 110, for example, may be an older production wellbore than second production wellbore 102. Additionally, a first injection wellbore 114 may extend from a third wellhead 116 into subterranean formation 106 from surface 108. First injection wellbore 114 may be an older injection well, for example, older with respect to new injector wells now being used. Generally, first production wellbore 110 and first injection wellbore 114 may include horizontal, vertical, slanted, curved, and other types of wellbore geometries and orientations. First production wellbore 110 and first injection wellbore 114 may be cased or uncased. In examples, a conductive member 118 may be disposed within first production wellbore 110 and first injection wellbore 114 and may comprise a metallic material that may be conductive and magnetic. By way of example, conductive member 118 may be a casing, liner, tubing, or other elongated steel tubular disposed in first production wellbore 110 and first injection wellbore 114.

Determining the position and direction of second production wellbore 102 accurately and efficiently may be required in a variety of applications. Second production wellbore 102, for example, may be a newer production well, for example, with respect to first production wellbore 110. For example, second production wellbore 102 may be in drilling operations and it may be desired to avoid collision with first production wellbore 110 and first injection wellbore 114 in drilling operations. In examples, it may be desirable to drill second production wellbore 102 parallel to first production wellbore 110 and first injection wellbore 114, for example, in SAGD applications. Alternatively, or additionally, first production wellbore 110 and first injection wellbore 114 may be may be a "blowout" well. First production wellbore 110 and first injection wellbore 114 may need to be intersected precisely by second production wellbore 102 in order to stop the "blowout." In examples, electromagnetic sensor system 100 may be used for determining the location of second production wellbore 102 with respect to first production wellbore 110 and first injection wellbore 114. It should be understood that the present techniques may also be applicable in offshore applications.

In further reference to FIG. 1, a drill string 120 may begin at First wellhead 104 and traverse second production well bore 102. At or close to an end of drill string 120 may be a bottom hole assembly 122. A drill bit 124 may be attached to a distal end of bottom hole assembly 122 and may be driven, for example, either by a downhole motor and/or via rotation of drill string 120 from surface 108. While not illustrated, bottom hole assembly 122 may be conductive and may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 122 may be part of or include a measurement-while drilling (MWD) or logging-while-drilling (LWD) system.

As illustrated, electromagnetic sensor system 100 may comprise a plurality of sensors 126. While FIG. 1 illustrates use of a plurality of sensors 126 on bottom hole assembly 122, it should be understood that the plurality of sensors 126 may be alternatively used on a wireline or another downhole conveyance, e.g. slickline or coiled tubing. The plurality of sensors 126 may be used for determining the distance and direction to first production wellbore 110 and first injection wellbore 114. Additionally, the plurality of sensors 126 may be connected to and/or controlled by information handling system 128, which may be disposed on surface 108.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, information handling system 128 may communicate with the plurality of sensors 126 through a communication line (not illustrated) disposed in (or on) drill string 120. In examples, wireless communication may be used to transmit information back and forth between information handling system 128 and the plurality of sensors 126. Information handling system 128 may transmit information to the plurality of sensors 126 and may receive as well as process information recorded by the plurality of sensors 126. In addition, the plurality of sensors 126 may include a downhole information handling system (not illustrated), which may also be disposed on bottom hole assembly 130. Processing may be performed at surface with information handling system 128, downhole with the downhole information handling system, or both at the surface and downhole. The downhole information handling system may include, but is not limited to, a microprocessor or other suitable circuitry, for estimating, receiving and processing signals received by the plurality of sensors 126. The downhole information handling system may further include additional components, such as memory, input/output devices, interfaces, and the like. While not illustrated, the bottom hole assembly 122 may include one or more additional components, such as analog-to-digital converter, filter and amplifier, among others, that may be used to process the measurements of the plurality of sensors 126 before they may be transmitted to surface 108. Alternatively, raw measurements from the plurality of sensors 126 may be transmitted to surface 108.

Any suitable technique may be used for transmitting signals from bottom hole assembly 122 to surface 108, including, but not limited to, wired pipe telemetry, mud-pulse telemetry, acoustic telemetry, and electromagnetic telemetry. While not illustrated, bottom hole assembly 122 may include a telemetry subassembly that may transmit telemetry data to the surface. An electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 128 via a communication link 134, which may be a wired or wireless link. The telemetry data may be analyzed and processed by information handling system 128. For example, the telemetry data may be processed to determine location of second production wellbore 102 in relation to first production wellbore 110 and first injection wellbore 114. Thus, a driller could control bottom hole assembly 122 while drilling second production wellbore 102 to intentionally intersect first production wellbore 110 and first injection wellbore avoid first production wellbore 110 and first injection wellbore 114, and/or drill second production wellbore 102 in a path parallel to first production wellbore 110 and first injection wellbore 114.

During ranging operations, a first source 136 may be attached to conductive member 118 disposed in first production wellbore 110. First source 136 may energize conductive member 118, which may transmit a first magnetic field 138 into subterranean formation 106. First magnetic field 138 may be transmitted at any number of frequencies, which may be sensed and recorded by at least one of the plurality of sensors 126 disposed on bottom hole assembly 122. In examples, a second source 140 may be attached to conductive member 118 disposed in first injection wellbore 114, which may transmit a second magnetic field 142 into subterranean formation 106. Second magnetic field 142 may be transmitted at any number of frequencies, which may be sensed and recorded by at least one of the plurality of sensors 126 disposed on bottom hole assembly 122. Measuring first magnetic field 138 and second magnetic field 142 may allow an operator to determine the distance and/or the location of electromagnetic sensor system 100 disposed in second production wellbore 102 from first production wellbore 110 and/or first injection wellbore 114.

Figure 2:
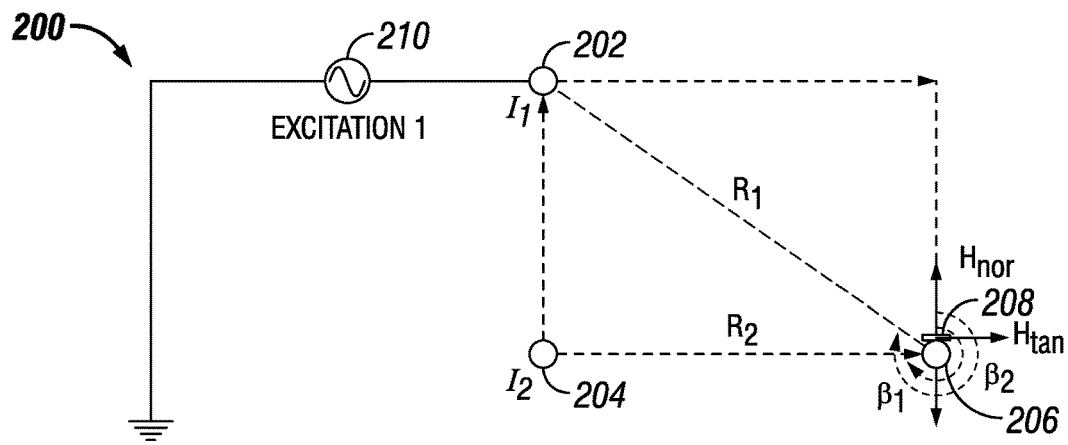
FIG. 2 is a schematic illustration of the electromagnetic sensor system in a wellbore for determining distance and location.

FIG. 2 illustrates a bird's eye view of FIG. 1 during a re-drill configuration 200. It should be noted that a re-drill configuration may be defined as system and method for determining the location of a drilling operation to existing wellbores. For example, first injection 202 and first production wellbore 204 may have been drilled previously. Without limitations, first injection 202 may be any suitable vertical and/or horizontal well that may inject a fluid into a formation 106 (e.g., referring to FIG. 1) to increase pressure in formation 106. Without limitation, first production wellbore 204 may be any suitable vertical and/or horizontal well that may be used to recover fluids from formation 106. In examples, second production wellbore 206 may be a drilling operation that may be in pre-drilling operations, drilling operations, or post-drilling operations. It should be noted that second production wellbore 206 may also be referred to and/or defined as a drilling operation. In examples, drilling operations, without limitation, may include drilling into formation 106 to create a producing well, injection well, and/or the like. As illustrated, $R_1$ is the distance from first injection 202 to second production wellbore 206. Additionally, $\beta_1$ is the direction from second production wellbore 206 to first injection 202. Furthermore, $R_2$ is the distance from first production wellbore 204 to second production wellbore 206 and $\beta_2$ is the direction from second production wellbore 206 to first production wellbore 204. During re-drilling operations, $H_{tan}$ and $H_{nor}$ may be recorded by sensor 208. In examples, $H_{tan}$ is sensory measurements in the y direction and $H_{nor}$ is sensory measurement in the x-direction. Both $H_{tan}$ and $H_{nor}$ may include field contributions from both first injection 202 and first production wellbore 204. Conventional magnetic ranging methods, illustrated in FIG. 1, first injection 202 may be identified as a "target well." In examples, a source 210, which may be a voltage or current source, may be connected between the "target well" and a remote ground (or observation well) to excite current to flow along the "target well." The current along the "target well" may generate a magnetic field, which may be measured and/or recorded by at least one sensor 208. The at least one sensor may be disposed at and/or near second production wellbore 206. However, current may leak out through a formation, which may be conductive, to first production wellbore 204. This leakage may create an interference field, which may skew measurements and ultimately distance and direction from the "target well" to second production wellbore 206. A new method of for determining distance and direction without an interference field may be beneficial.

Figure 3:
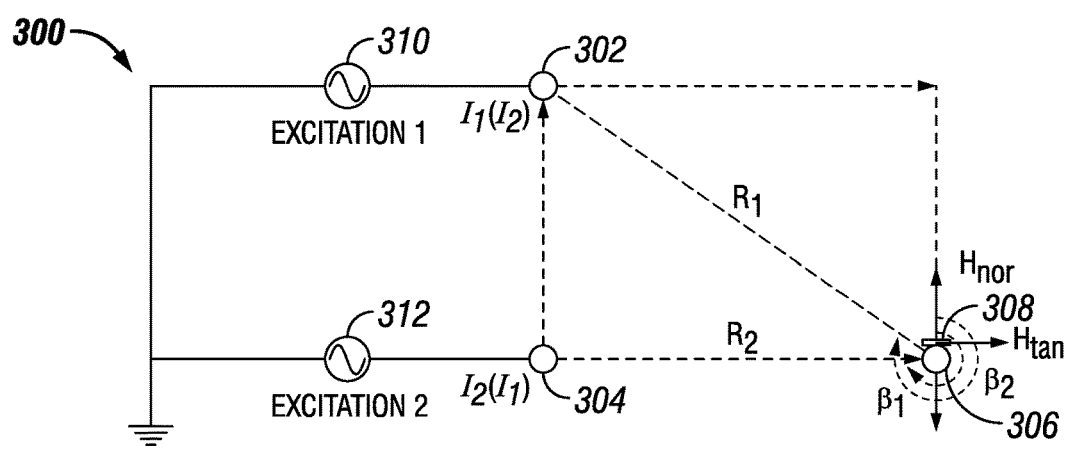
FIG. 3 is another schematic illustration of the electromagnetic sensor system in a wellbore for determining distance and location.

FIG. 3 illustrates a method that may determine distance and direction without an interference field from the "target well" to second production wellbore 306. In examples, re-drill configuration 300 may utilize first injection 302 and first production 304 each as a "target well." First injection 302 and first production 304 may be energized and transmit a magnetic field into a formation that may be measured and recorded by sensor 308 at second production wellbore 306. This operation may be performed subsequently to take a survey at first injection 302 and first production 304.

For example, during operations, first injection 302 may be excited by a first source 310, which may be a voltage or current source. Current $I_1$ may flow from first production 304. Additionally, leakage current $I_2$ may leak out of first production 304. Measurements of H fields, $H_{tan}$ and $H_{nor}$, may be measured and recorded by sensors 308 at second production wellbore 306. A second source 312, which may be a voltage or current source, may excite first production 304. It should be noted that first source 310 may excite both first injection 302 and first production 304 or second source 312 may excite both first injection 302 and first production 304. Due to reciprocity of the two excitation configuration and similar properties of metal pipes, which may be disposed into the formation at first injection 302 and first production 304 as casing, current $I_1$ may flow from first production 302 and $I_2$ may leak out of first injection 302. Measurements of H fields, $H_{tan}$ and $H_{nor}$, when second source 312 excites first production 304 may be measured and recorded by sensors 308 at second production wellbore 306.

TABLE 1

$$H_{tan}(1) = \frac{I_1}{2\pi R_1}\cos(TF+\beta_1) + \frac{I_2}{2\pi R_2}\cos(TF+\beta_2) \quad (1)$$

$$H_{nor}(1) = \frac{I_1}{2\pi R_1}\sin(TF+\beta_1) + \frac{I_2}{2\pi R_2}\sin(TF+\beta_2) \quad (2)$$

$$H_{tan}(2) = \frac{I_2}{2\pi R_1}\cos(TF+\beta_1) + \frac{I_1}{2\pi R_2}\cos(TF+\beta_2) \quad (3)$$

$$H_{nor}(2) = \frac{I_2}{2\pi R_1}\sin(TF+\beta_1) + \frac{I_1}{2\pi R_2}\sin(TF+\beta_2) \quad (4)$$

In examples, first injection 302 and first production 304 have already been drilled, thus their relative position is known. Therefore, unknowns such as $R_2$ and $\beta_2$ may be eliminated by representing them as $R_1$ and $\beta_1$, which may increase accuracy of determining direction and distance from second production 306. For example, if first injection 302 is located 5 miles (8.047 kilometers) above first production 304, the following equation may be used:

$$R_2 = \sqrt{R_1^2 + 25 - 10 \times R_1 \times \cos(\beta_1)}$$

where $$\beta_2 = \alpha \tan 2d(R_1 \sin(\beta_1), R_1 \cos(\beta_1) - 5)$$

Therefore, there may be four equation with four unknowns ($I_1$, $I_2$, $R_1$, $\beta_1$) in the equation system seen in Table 1.

Accuracy of this method may be seen below. In examples, a thinwire modeling code is used to model the response $H_{tan}$ and $H_{nor}$ for re-drill configuration 300, as illustrated in FIG. 3. Three horizontal wells with 1200 meter (3,937 feet) depths may be modeled in the placement as in FIG. 3. At a depth of 700 meters (2,296 feet) a lateral section may be identified for measurements. The distance and direction results calculated with a convention method approach (FIG. 2) and the results solved from Table 1 system (method from FIG. 3) are compared in Table 2. Different initial guesses have been tested in solving the Table 1 system. The solution is stable with a wide range of initial guesses.

TABLE 2

|  | True Value | Single Excitation | Multiple Excitation |
| --- | --- | --- | --- |
| Distance (m) | 7.07 | 6.25 | 7.45 |
| Direction (deg) | 315 | 296.4 | 311.5 |
| Distance Error |  | 11.6% | 5.37% |
| Direction Error |  | 18.6 deg | 4.5 deg |

Figure 4:
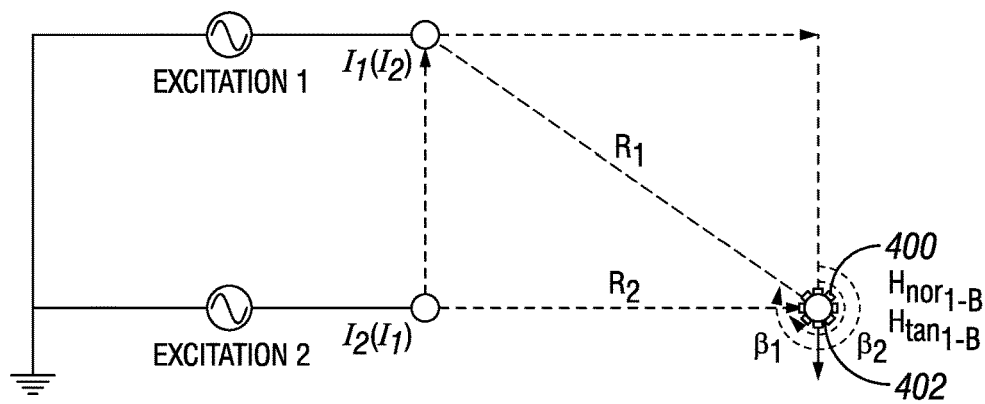
FIG. 4 is another schematic illustration of the electromagnetic sensor system in a wellbore for determining distance and location.

In the above examples, in FIG. 3 and Table 1, the tool face angle is assumed to be 0 degrees. During operations, when the tool face may be constantly changing during drilling operations, sensor 308 (e.g., referring to FIG. 3) may have a blind spot for certain tool face angles. FIG. 4 shows and improved configuration with eight sensors 400 disposed azimuthally around a tool axis, which may be dispose din second production 402 during drilling operations. Each sensor may measure and record two measurements, $H_{tan\_i}$ and $H_{nor\_j}$. A system for solving for distance and direction with eight sensors 400 may be found in Table 3, seen below. For each excitation, one result matrix may be formed by calibrate the measurements of eight sensors 400 by a pre-calculated calibration matrix. The resulting matrix may contain four components: tangential H field, normal H-field, tangential gradient H field, and normal Gradient H-field. The gradient field may be obtained from sensor pairs at opposite azimuths. This larger equation system with more measurements may solve for accurate distance and direction for arbitrary tool face angles.

TABLE 3

$$\text{Matrix1}(1) = \frac{I_1}{2\pi R_1}\cos(\beta + \beta_{ref1}) + \frac{I_2}{2\pi R_2}\cos(\beta + \beta_{ref2}) \quad (1)$$

$$\text{Matrix1}(2) = \frac{I_1}{2\pi R_1}\sin(\beta + \beta_{ref1}) + \frac{I_2}{2\pi R_2}\sin(\beta + \beta_{ref2}) \quad (2)$$

$$\text{Matrix1}(3) = -\frac{I_1}{2\pi R_1^2}\cos(2\times(\beta + \beta_{ref1})) - \frac{I_2}{2\pi R_2^2}\cos(2\times(\beta + \beta_{ref2})) \quad (3)$$

$$\text{Matrix1}(4) = -\frac{I_1}{2\pi R_1^2}\sin(2\times(\beta + \beta_{ref1})) - \frac{I_2}{2\pi R_2^2}\sin(2\times(\beta + \beta_{ref2})) \quad (4)$$

$$\text{Matrix2}(1) = \frac{I_1}{2\pi R_1}\cos(\beta + \beta_{ref1}) + \frac{I_2}{2\pi R_2}\cos(\beta + \beta_{ref2}) \quad (5)$$

$$\text{Matrix2}(2) = \frac{I_1}{2\pi R_1}\sin(\beta + \beta_{ref1}) + \frac{I_2}{2\pi R_2}\sin(\beta + \beta_{ref2}) \quad (6)$$

$$\text{Matrix2}(3) = -\frac{I_1}{2\pi R_1^2}\cos(2\times(\beta + \beta_{ref1})) - \frac{I_2}{2\pi R_2^2}\cos(2\times(\beta + \beta_{ref2})) \quad (7)$$

$$\text{Matrix2}(4) = -\frac{I_1}{2\pi R_1^2}\sin(2\times(\beta + \beta_{ref1})) - \frac{I_2}{2\pi R_2^2}\sin(2\times(\beta + \beta_{ref2})) \quad (8)$$

Both system in Table 1 and table 3 are nonlinear equation systems. The distance and direction may be solved or inverted by various optimization or inversion algorithms. The increase number of measurements and reduced number of unknowns proposed by the new multiple excitation method may help to promote the robustness and convergence of the inversion process. Solutions may also be less dependent on the initial guesses.

Figure 5:
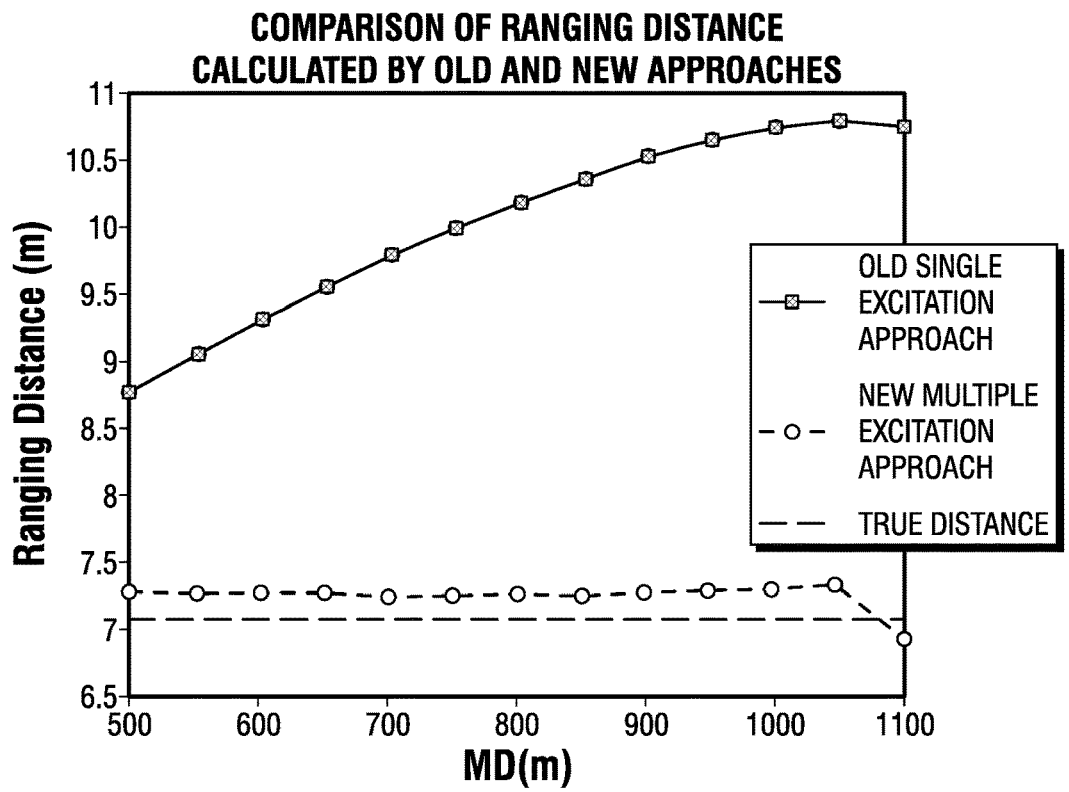
FIG. 5 is another schematic illustration of the electromagnetic sensor system in a wellbore for determining distance and location.
Figure 6:
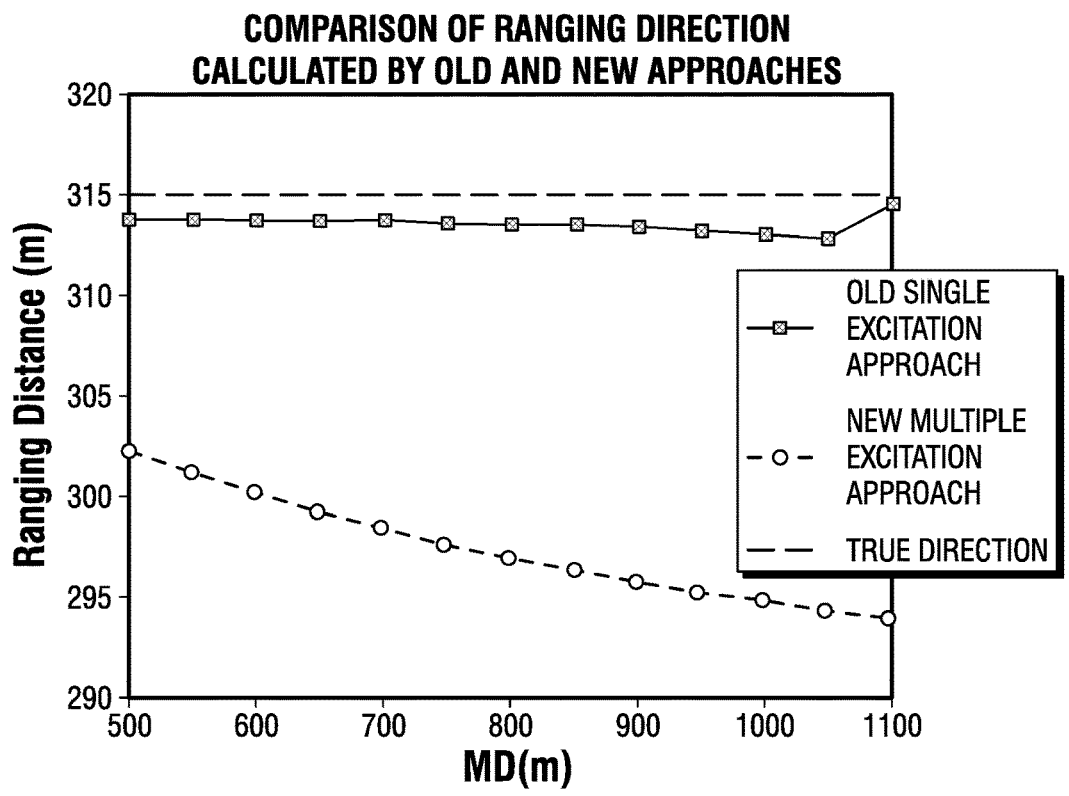
FIG. 6 is another schematic illustration of the electromagnetic sensor system in a wellbore for determining distance and location.

The thinwire modeling code may also used to model the response $H_{tan}$ and $H_{nor}$ for the two-excitation multiple-sensor configuration in FIG. 4. Three horizontal wells with 1200 meters (3,937 feet) depths are modeled as illustrated in FIG. 4 with various tool face angles along the lateral section depth between 500 m-1100 m (1640 feet to 3608 feet). The distance and direction results calculated with the old single excitation approach and the results solved from Table 3 system are compared in FIGS. 5 and 6 for multiple depths along the lateral section. It may be seen that the new method helps to greatly reduce the distance and direction errors compared to the old method. It provides stable results for different depths (tool face angles) with reasonable errors compared to the true distance and direction.

Figure 7:
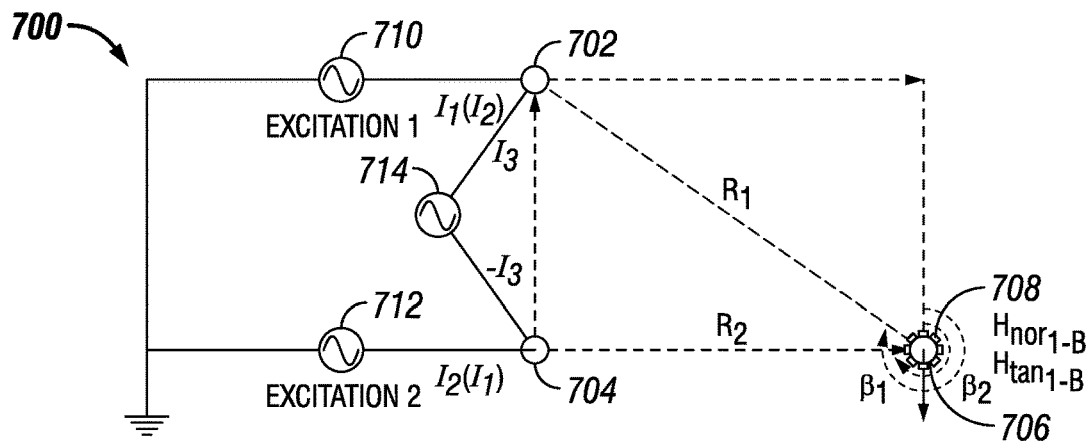
FIG. 7 is another schematic illustration of the electromagnetic sensor system in a wellbore for determining distance and location.

FIG. 7 illustrates an example where multiple excitation configurations may be deployed to further increase measurements and enhance solution accuracy. In examples, first injection 702 may be excited by a source 710, which may be a voltage or current source, and first production 704 may be excited by a source 712, which may be a voltage or current source. Additionally, a third source 714 may excite first injection 702 and first production 704. Third source 714 may emit a similar current distribution along first injection 702 and first production 704 in opposite directions. The third excitation may add one more unknown 13, where 13 is the current from third source 714 to first injection 702. However, a plurality of sensors 708 disposed in second production 706 may measure and record additional measurements from third source 714. Updating the inversion solution in Table 2 may help in determining the direction and distance from second production 706 to first injection 702 and first production 704.

Figure 8:
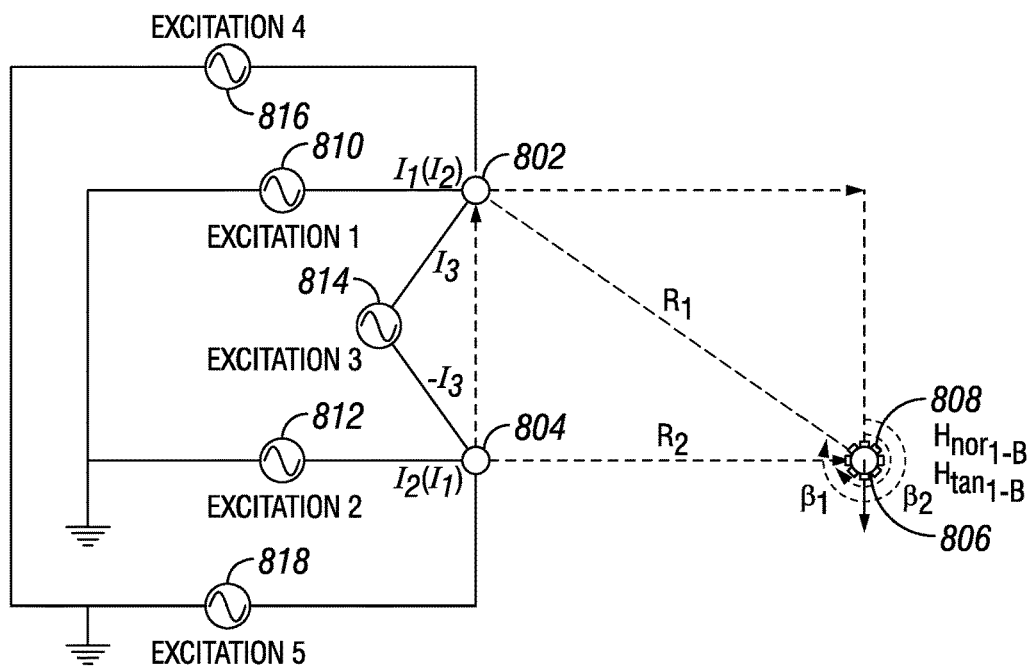
FIG. 8 is another schematic illustration of the electromagnetic sensor system in a wellbore for determining distance and location.

FIG. 8 shows a five excitation configuration. Besides excitations in FIG. 7, more excitations may be deployed between first injection 802 and first production 804 and multiple sources, such as source 810, source 812, source 814, source 816, and/or source 818 (e.g., sources may be ground stakes, observation wells, and other nearby wells). Each source may add additional unknown currents to be measured and may be used in calculations. However, second production 806 may capture a plurality of measurements, which may be generated with a plurality of sensors 808.

Figure 9:
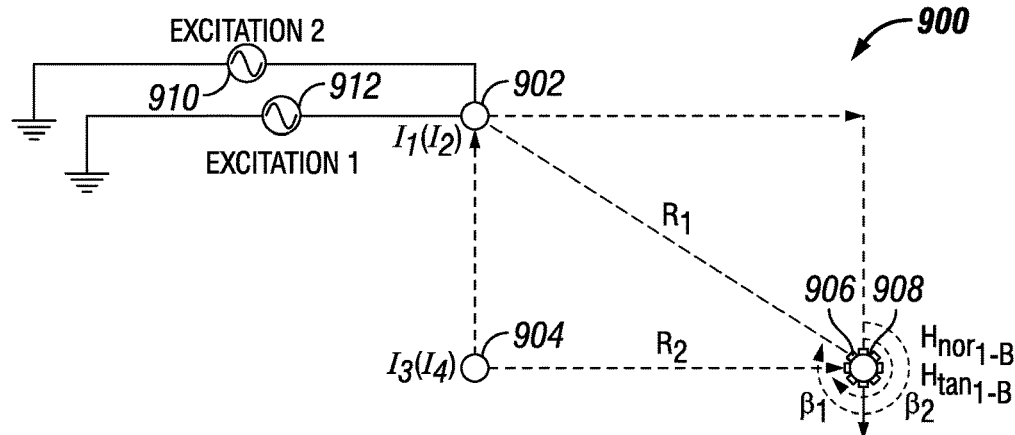
FIG. 9 is another schematic illustration of the electromagnetic sensor system in a wellbore for determining distance and location.

In examples, a new well may be drilled from an old wellhead (e.g., a step-out). In such examples, the old well (e.g., first injection 802 and/or first production 804) may not be accessible in measurement operations. In such examples, an operator may not be able to deploy the reciprocal excitations with first injection 802 and first production 804 (i.e., FIGS. 2-4, 7, and 8). However, as illustrated in FIG. 9, an operator may employ a plurality of sources to generate more measurements. For example, source 910 and source 912 may excite first injection 902 at different times and different frequencies. This may generate a plurality of unknowns (different current from different sources) from measurements, however a plurality of measurements recorded by sensors 908 in second production 906, which may assist in inversion measurements with distance and direction. Additionally, a plurality of surveys for each excitation with different tool faces may also increase measurements.

Figure 10:
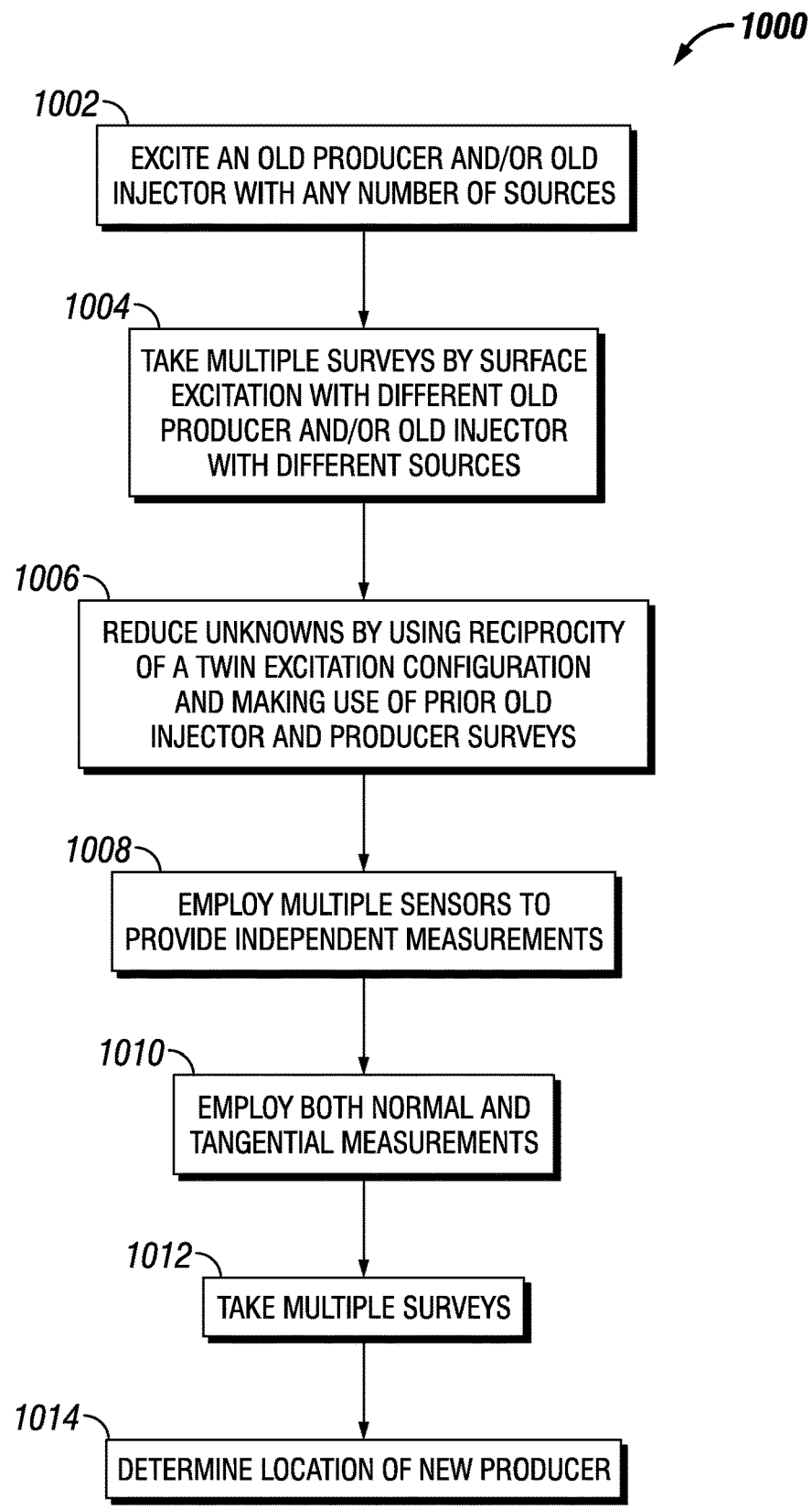
FIG. 10 is a flow chart for determining a location of a second production wellbore.

Systems described above may operate and/or function by any suitable method. FIG. 10 illustrates a flow chart 1000 for determining a location of a second production wellbore. In step 1002 an operator may excite a first production and/or a first injection with any number of sources. Sources may transmit current at any number of frequencies at any time interval. In examples, multiple sources, which may be attached at the first production and/or the first injection may transmit sequentially and/or simultaneously. In step 1004 an operator may take multiple surveys by surface excitation with different first productions and/or first injections with different sources. In step 1006, an operator may reduce unknowns by using reciprocity of a twin excitation configurations (e.g., first injection and/or first production) and making use of prior first injection and producer surveys. In step 1008, an operator may employ multiple sensors to provide independent measurements, including gradient measurements. In step 1010, an operator may employ both normal and tangential measurements to provide more independent measurements. In step 1012, multiple surveys may be taken with different tool faces to further increase the number of measurements. In step 1014, measurements taken may be utilized to determine the location on a second production wellbore.

Improvements over current technology may be found in the reduction of unknowns in measurements by using prior information on first injection wells, first production wells, and producer surveys. Improvements may also include reducing unknowns by using current reciprocity of twin excitations, using multiple excitations with multiple grounds to increase measurements, and using multiple sensors to generate more independent measurements and enable gradient measurements. Improvements may also include using both normal and tangential components to increase measurements and taking multiple surveys for different tool faces to further increase measurements.

This systems and methods may include any of the various features of the compositions, methods, and system disclosed herein, including one or more of the following statements.

Statement 1. A method for determining a position of a second production wellbore may comprise inducing a first current into a first conductive member with a first source, wherein the first conductive member is disposed in a first injection wellbore, emitting a first magnetic field generated by the first current from the first conductive member into a formation, inducing a second current into a second conductive member with a second source, wherein the second conductive member is disposed in a first production wellbore, emitting a second magnetic field generated by the second current from the second conductive member into the formation, disposing an electromagnetic sensor system into the second production wellbore, wherein the electromagnetic sensor system comprises at least one sensor, recording the first magnetic field with the at least one sensor from the formation, and recording the second magnetic field with the at least one sensor from the formation.

Statement 2. The method of statement 1, wherein the first current in the first conductive member and the second current in the second conductive member are induced separately.

Statement 3. The method of statement 1 or 2, wherein the electromagnetic sensor system is connected to an information handling system.

Statement 4. The method of statements 1 to 3, further comprising exciting the first conductive member with a plurality of grounding positions to generate a plurality of magnetic fields.

Statement 5. The method of statements 1 to 4, further comprising exciting the second conductive member with a plurality of grounding positions to generate a plurality of magnetic fields.

Statement 6. The method of statements 1 to 5, further comprising using reciprocity of two excitations with the same grounding position.

Statement 7. The method of statement 1 to 6, further comprising using a known distance between the first production wellbore and the first injection wellbore to determine a position of the second production wellbore from the first production wellbore and the first injection wellbore.

Statement 8. The method of statements 1 to 7, wherein the first source is attached to the first injection wellbore and the first production wellbore.

Statement 9. The method of statements 1 to 8, wherein the electromagnetic sensor system further comprising a plurality of sensors.

Statement 10. The method of statements 1 to 9, wherein the plurality of sensors are magnetometers.

Statement 11. A method for determining a position of a second production wellbore may comprise inducing a first current into a first conductive member with a first source, emitting a first magnetic field generated by the first current from the first conductive member into a formation, inducing a second current into the first conductive member with a second source, emitting a second magnetic field generated by the second current from the first conductive member into the formation, disposing an electromagnetic sensor system into the second production wellbore, wherein the electromagnetic sensor system comprises at least one sensor, recording the first magnetic field with the at least one sensor from the formation, and recording the second magnetic field with the at least one sensor from the formation.

Statement 12. The method of statement 11, wherein the first conductive member is disposed in a first production wellbore.

Statement 13. The method of statements 11 or 12, further comprising generating a plurality of magnetic fields at the first conductive member.

Statement 14. The method of statements 11 to 13, wherein a second conductive member is disposed in a first injection wellbore.

Statement 15. The method of statements 11 to 14, further comprising generating a plurality of magnetic fields at the second conductive member.

Statement 16. The method of statements 11 to 15, wherein the electromagnetic sensor system is connected to an information handling system.

Statement 17. A system for determining a position of a second production wellbore may comprise a first source, wherein the first source is attached to a conductive member, and an electromagnetic sensor system comprising at least one sensor. The system may further comprise an information handling system configured to determine the position of the second production wellbore.

Statement 18. The system of statement 17, wherein the electromagnetic sensor system comprises a plurality of sensors.

Statement 19. The system of statements 17 or 18, further comprising a second source, wherein the second source is connected to the conductive member and is configured to excite the conductive member at a different time than the first source.

Statement 20. The system of statements 17 to 19, further comprising a second source, wherein the second source is connected to a second conductive member and is configured to excite the second conductive member at a different time than the first source.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining a position of a second production wellbore, comprising:
    inducing a first current into a first conductive member with a first source, wherein the first conductive member is disposed in a first injection wellbore;
    emitting a first magnetic field into a formation;
    inducing a second current into a second conductive member with a second source, wherein the second conductive member is disposed in a first production wellbore;
    emitting a second magnetic field into the formation;
    inducing a third current into the first conductive member and the second conductive member at the same time with a third source by connecting the third source to both the first conductive member and the second conductive member in parallel;
    emitting a third magnetic field into the formation;
    disposing an electromagnetic sensor system into the second production wellbore, wherein the electromagnetic sensor system comprises one or more sensors;
    recording the first magnetic field with the one or more sensors from the formation;
    recording the second magnetic field with the one or more sensors from the formation; and
    recording the third magnetic field with the one or more sensors form the formation.

2. The method of claim 1, wherein the first current in the first conductive member and the second current in the second conductive member are induced separately.

3. The method of claim 1, wherein the electromagnetic sensor system is connected to an information handling system.

4. The method of claim 1, further comprising exciting the first conductive member with a plurality of grounding positions to generate a plurality of magnetic fields.

5. The method of claim 1, further comprising exciting the second conductive member with a plurality of grounding positions to generate a plurality of magnetic fields.

6. The method of claim 1, further comprising using reciprocity of two excitations with the same grounding position.

7. The method of claim 1, further comprising using a known distance between the first production wellbore and the first injection wellbore to determine a position of the second production wellbore from the first production wellbore and the first injection wellbore.

8. The method of claim 1, wherein the first source is attached to the first injection wellbore and the first production wellbore.

9. The method of claim 1, wherein the electromagnetic sensor system further comprising a plurality of sensors.

10. The method of claim 9, wherein the plurality of sensors are magnetometers.

11. A method for determining a position of a second production wellbore comprising:
    inducing a first current into a first conductive member with a first source;
    emitting a first magnetic field into a formation;
    inducing a second current into the first conductive member and a second conductive member at the same time with a second source by connecting the second source to both the first conductive member and the second conductive member in parallel;
    emitting a second magnetic field into the formation;
    disposing an electromagnetic sensor system into the second production wellbore, wherein the electromagnetic sensor system comprises one or more sensors;
    recording the first magnetic field with the one or more sensors from the formation; and
    recording the second magnetic field with the one or more sensors from the formation.

12. The method of claim 11, wherein the first conductive member is disposed in a first production wellbore.

13. The method of claim 12, further comprising generating a plurality of magnetic fields at the first conductive member.

14. The method of claim 11, wherein the second conductive member is disposed in a first injection wellbore.

15. The method of claim 14, further comprising generating a plurality of magnetic fields at the second conductive member.

16. The method of claim 11, wherein the electromagnetic sensor system is connected to an information handling system.

17. A system for determining a position of a drilling operation comprising:
   a first source, wherein the first source is attached to a first conductive member;
   a second source, wherein the second source is connected to the first conductive member and a second conductive member in parallel
   an electromagnetic sensor system comprising:
      at least one sensor; and
      an information handling system connected to the first source, the second source, the electromagnetic sensor system, and configured to determine the position of the drilling operation; and
   to excite the first conductive member and the second conductive member at the same time with the second source.

18. The system of claim 17, wherein the electromagnetic sensor system comprises a plurality of sensors.

19. The system of claim 17, further comprising a third source, wherein the third source is connected to the first conductive member and the information handling system is further configured to excite the first conductive member at a different time than the first source with the third source.

20. The system of claim 17, further comprising a third source, wherein the third source is connected to the second conductive member and the information handling system is further configured to excite the second conductive member at a different time than the first source with the third source.

* * * * *